(12) United States Patent
Ban et al.

(10) Patent No.: US 8,080,323 B2
(45) Date of Patent: Dec. 20, 2011

(54) CUTTING INSERT WITH A WEAR-RESISTANT COATING SCHEME EXHIBITING WEAR INDICATION AND METHOD OF MAKING THE SAME

(75) Inventors: Zhigang Ban, Latrobe, PA (US); Mark J. Rowe, New Derry, PA (US); Yixiong Liu, Greensburg, PA (US); Alfred S. Gates, Jr., Greensburg, PA (US); Kent P. Mizgalski, Stahlstown, PA (US); Mark S. Greenfield, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 389 days.

(21) Appl. No.: 12/057,564

(22) Filed: Mar. 28, 2008

(65) Prior Publication Data

US 2009/0004440 A1 Jan. 1, 2009

Related U.S. Application Data

(63) Continuation-in-part of application No. 11/823,679, filed on Jun. 28, 2007.

(51) Int. Cl.
*B32B 9/00* (2006.01)
(52) U.S. Cl. ............ 428/698; 51/307; 51/309; 407/119; 428/336; 428/697; 428/699; 428/701; 428/702
(58) Field of Classification Search .................. 51/307, 51/309; 428/336, 697, 698, 699, 701, 702; 407/119
See application file for complete search history.

(56) References Cited

U.S. PATENT DOCUMENTS

| | | | |
|---|---|---|---|
| 3,793,627 A | 2/1974 | Darrell et al. | |
| 4,420,253 A | 12/1983 | Pryor | |
| 4,674,365 A | 6/1987 | Reed | |
| 4,714,660 A | 12/1987 | Gates, Jr. | |
| 4,818,153 A | 4/1989 | Strandell et al. | |
| 4,831,365 A | 5/1989 | Thomas et al. | |
| 4,886,009 A | 12/1989 | Gondar et al. | |
| 4,984,940 A | 1/1991 | Bryant et al. | |
| 5,000,036 A | 3/1991 | Yellowley et al. | |
| 5,059,905 A | 10/1991 | Drits | |
| 5,071,696 A | 12/1991 | Chatfield et al. | |

(Continued)

FOREIGN PATENT DOCUMENTS

EP 0596619 5/1994

(Continued)

*Primary Examiner* — Archene Turner
(74) *Attorney, Agent, or Firm* — Matthew W. Gordon

(57) ABSTRACT

A coated cutting insert for use in a chip-forming material removal operation wherein the coated cutting insert includes a substrate that has a flank surface and a rake surface and the flank surface intersects the rake surface to form a cutting edge at the intersection. There is a wear-resistant coating scheme that adheres to at least a portion of the substrate. The wear-resistant coating scheme includes one or more coating layers of one or more of alumina, hafnia and zirconia. There is a wear indicating coating that adheres to at least a portion of the wear-resistant coating scheme. The wear indicating coating includes $M(O_xC_yN_z)$ wherein M is selected from the group comprising one or more of the following titanium, hafnium, zirconium, chromium, titanium-aluminum alloy, hafnium-aluminum alloy, zirconium-aluminum alloy, chromium-aluminum alloy, and their alloys, and $x>0$, $y \geq 0$, $z \geq 0$ and $y+z>0$. A method of making a cutting insert with wear indicating coating including the steps of: providing a substrate with an outer alumina coating layer; applying an as-deposited non-wear indicating coating layer to the alumina coating layer; and treating the non-wear indicating coating layer to convert it to a wear indicating coating layer.

30 Claims, 12 Drawing Sheets

U.S. PATENT DOCUMENTS

| | | | |
|---|---|---|---|
| 5,192,578 A | 3/1993 | Ramm et al. |
| 5,226,929 A | 7/1993 | Carmichael et al. |
| 5,228,478 A | 7/1993 | Kleisle |
| 5,303,574 A | 4/1994 | Matossian et al. |
| 5,372,873 A | 12/1994 | Yoshimura et al. |
| 5,374,471 A | 12/1994 | Yoshimura et al. |
| 5,442,981 A | 8/1995 | Vegh |
| 5,487,625 A | 1/1996 | Ljungberg et al. |
| 5,543,176 A | 8/1996 | Chatfield et al. |
| 5,576,093 A | 11/1996 | Yoshimura et al. |
| 5,597,272 A | 1/1997 | Moriguchi et al. |
| 5,603,161 A | 2/1997 | Welsh |
| 5,635,247 A | 6/1997 | Ruppi |
| 5,652,045 A | 7/1997 | Nakamura et al. |
| 5,674,564 A | 10/1997 | Ljungberg et al. |
| 5,681,651 A | 10/1997 | Yoshimura et al. |
| 5,700,551 A | 12/1997 | Kukino et al. |
| 5,700,569 A | 12/1997 | Ruppi |
| 5,702,808 A | 12/1997 | Ljungberg |
| 5,766,782 A | 6/1998 | Ljungberg et al. |
| 5,776,588 A | 7/1998 | Moriguchi et al. |
| 5,851,687 A | 12/1998 | Ljungberg et al. |
| 5,861,210 A | 1/1999 | Lenander et al. |
| 5,863,640 A | 1/1999 | Ljungberg et al. |
| 5,906,834 A | 5/1999 | Tseng |
| 5,912,051 A | 6/1999 | Olsson et al. |
| 5,945,207 A | 8/1999 | Kutscher et al. |
| 5,968,595 A | 10/1999 | Kutscher |
| 6,007,909 A | 12/1999 | Rolander et al. |
| 6,015,614 A | 1/2000 | Ruppi |
| 6,090,476 A | 7/2000 | Thysell et al. |
| 6,177,178 B1 | 1/2001 | Ostlund et al. |
| 6,293,739 B1 | 9/2001 | Uchino et al. |
| 6,309,738 B1 | 10/2001 | Sakurai |
| 6,333,098 B1 | 12/2001 | Olsson et al. |
| 6,333,103 B1 | 12/2001 | Ishii et al. |
| 6,344,265 B1 | 2/2002 | Blomstedt et al. |
| 6,350,510 B1 | 2/2002 | Konig et al. |
| 6,379,798 B1 | 4/2002 | Yazaki |
| 6,406,224 B1 | 6/2002 | Ostlund et al. |
| 6,449,998 B1 | 9/2002 | Takeda et al. |
| 6,457,566 B1 | 10/2002 | Toby |
| 6,472,060 B1 | 10/2002 | Ruppi |
| 6,599,062 B1 | 7/2003 | Oles et al. |
| 6,620,498 B2 | 9/2003 | Ruppi et al. |
| 6,627,335 B2 | 9/2003 | Kodama et al. |
| 6,652,913 B2 | 11/2003 | Ruppi et al. |
| 6,662,570 B2 | 12/2003 | Prevey, III |
| 6,682,274 B2 | 1/2004 | Votsch |
| 6,713,172 B2 | 3/2004 | Ljungberg et al. |
| 6,730,392 B2 | 5/2004 | Vetter et al. |
| 6,794,064 B2 | 9/2004 | Vetter |
| 6,824,823 B2 | 11/2004 | Kodama et al. |
| 6,869,668 B2 | 3/2005 | Nartensson |
| 6,884,386 B2 | 4/2005 | Saka et al. |
| 6,884,496 B2 | 4/2005 | Westphal |
| 7,021,872 B2 | 4/2006 | Hauptmann |
| 7,033,643 B2 | 4/2006 | Sugita |
| 7,067,203 B2 | 6/2006 | Joelsson et al. |
| 7,090,914 B2 | 8/2006 | Yamagata et al. |
| 7,097,901 B2 | 8/2006 | Larsson et al. |
| 7,132,153 B2 | 11/2006 | Zackrisson et al. |
| 7,135,221 B2 | 11/2006 | Ruppi |
| 7,150,772 B2 | 12/2006 | Larsson et al. |
| 7,153,562 B2 | 12/2006 | Rodmar et al. |
| 7,159,425 B2 | 1/2007 | Prevey et al. |
| 7,163,735 B2 | 1/2007 | Ruppi |
| 7,169,485 B2 | 1/2007 | Kohara et al. |
| 7,192,637 B2 | 3/2007 | Ruppi et al. |
| 7,192,660 B2 | 3/2007 | Ruppi |
| 7,226,670 B2 | 6/2007 | Derflinger et al. |
| 7,232,603 B2 | 6/2007 | Hessman |
| RE39,884 E | 10/2007 | Ostlund et al. |
| RE39,912 E | 11/2007 | Nordgren et al. |
| RE39,986 E | 1/2008 | Reineck et al. |
| RE39,987 E | 1/2008 | Ljungberg et al. |
| RE40,005 E | 1/2008 | Kutscher et al. |
| RE40,026 E | 1/2008 | Waldenstrom et al. |
| RE40,082 E | 2/2008 | Nordgren et al. |
| 7,655,293 B2 | 2/2010 | Ljungberg |
| 2002/0187370 A1 | 12/2002 | Yamagata et al. |
| 2005/0202283 A1 | 9/2005 | Gates et al. |
| 2006/0147755 A1 | 7/2006 | Hessman |
| 2006/0257690 A1 | 11/2006 | Bjormander |
| 2007/0009763 A1 | 1/2007 | Littecke et al. |
| 2007/0134517 A1 | 6/2007 | Martensson et al. |
| 2007/0148497 A1 | 6/2007 | Sundstrom et al. |
| 2007/0292672 A1 | 12/2007 | Ljungberg et al. |
| 2007/0298230 A1 | 12/2007 | Omori et al. |
| 2007/0298281 A1 | 12/2007 | Andersson et al. |
| 2007/0298282 A1 | 12/2007 | Andersson et al. |
| 2008/0028684 A1 | 2/2008 | Schier |
| 2008/0107882 A1 | 5/2008 | Littecke et al. |

FOREIGN PATENT DOCUMENTS

| | | |
|---|---|---|
| EP | 1717348 | 11/1996 |
| EP | 1201386 | 1/2004 |
| EP | 1734155 | 12/2006 |
| EP | 1757389 | 2/2007 |
| WO | 2006/059551 A1 | 6/2006 |

ψ = tilt angle
φ = rotation angle
$\sigma_1$ $\sigma_2$ = principal stresses
$\sigma_\varphi$ = stress at rotation angle φ

US 8,080,323 B2

CUTTING INSERT WITH A WEAR-RESISTANT COATING SCHEME EXHIBITING WEAR INDICATION AND METHOD OF MAKING THE SAME

CROSS-REFERENCE TO EARLIER CO-PENDING PATENT APPLICATION

This patent application is a continuation-in-part of earlier-filed and co-pending U.S. patent application Ser. No 11/823, 679 filed on Jun. 28, 2007 by Zhigang Ban, Mark J. Rowe, Yixiong Liu, and Alfred S. Gates, Jr. for a CUTTING INSERT WITH A WEAR-RESISTANT COATING SCHEME EXHIBITING WEAR INDICATION AND METHOD OF MAKING THE SAME. Applicants (Zhigang Ban, Mark J. Rowe, Yixiong Liu, Alfred S. Gates, Jr., Kent P. Mizgalski and Mark S. Greenfield) claim under the United States Patent Statute (Title 35, United States Code) including 35 U.S.C. §120 the benefit of the filing date of such earlier parent patent application (Ser. No. 11/823,679).

BACKGROUND OF THE INVENTION

The present invention relates to a coated cutting insert with a wear-resistant coating scheme that exhibits wear indication and a method of making the same. More specifically, the invention pertains to a coated cutting insert with a wear-resistant coating scheme that exhibits wear indication via visually contrasting colors of an outer wear-indicating coating layer that operatively adheres to an alumina coating layer, as well as a method of making the coated cutting insert.

Milling cutters and other tools used for the removal of material from a workpiece (e.g., machining of a workpiece) sometimes present one or several cutting inserts. Each one of these cutting inserts exhibits a certain tool life so that from time-to-time the operator must replace the used cutting inserts with unused cutting inserts. The operator will make a complete replacement of the cutting insert when it has only one cutting edge. In reference to a cutting insert with multiple cutting edges, the operator will index the cutting insert to expose an unused cutting edge when the engaged cutting edge nears the end of its useful tool life.

It can be detrimental to the overall material removal operation for a used cutting edge to be placed back in service. Thus, it would be advantageous to identify easily a used cutting edge to avoid placing a used cutting edge back in service.

Heretofore, there have been coating schemes for cutting inserts useful to detect the use of a specific cutting edge. In this regard, U.S. Pat. No. 6,682,274 B2 to Vötsch et al. pertains to a coated cutting insert with wear indicating properties wherein the flank or flanks of the cutting insert according to the invention is (are) provided with a wearable indicating layer, having a color that differs from the color of the surface or layer underneath. The wear indicating coating layer does not extend to the cutting edge and is "sensitive enough, so that even a short-term use of the adjacent cutting edge leaves clear traces on the indicating layer." See Abstract.

European Patent Application No. 1 757 389 A1, which was not published until Feb. 28, 2007 (the PCT equivalent (PCT WO 2006/067956) carries a publication date of Jun. 29, 2006), appears to disclose a coating arrangement on the surface of a cutting tool that comprises four basic layers. The layers are in the following order moving out from the substrate: third layer (next to substrate), first layer, second layer and fourth layer. The first layer is underneath the second layer and comprises titanium boronitride (TiBN) or titanium boron-oxynitride (TiBNO). The second layer is, " . . . implemented as a single layer or a plurality of layers, by at least one selected from the group consisting of aluminum oxide, zirconium oxide, hafnium oxide and a solid solution mainly including two or more of these components, and the second coating layer is located directly on the first coating layer." The third layer is between the first layer and the substrate and includes TiC, TiN, TiCN, TiCNO, TiB$_2$, TiBN, TiCBN, ZrC, ZrO$_2$HfC, HfN, TiAlN, AlCrN, CrN, VN, TiSiN, TiSiCN, AlTiCrN, and TiAlCN. The fourth layer is the coating layer that functions as a wear indicating coating layer and can include TiCNO and is removed from the cutting area by blasting.

Kennametal Inc. of Latrobe, Penn. 15650 United States of America makes and sells a commercial prior art coated cutting insert. This prior art coated cutting insert presents a coating scheme as follows: a titanium nitride base coating layer on the substrate, a titanium carbonitride coating layer on the titanium nitride coating layer, a bonding layer that includes Ti, Al, O, C and N on the titanium carbonitride coating layer and an alpha-alumina coating layer on the bonding layer. During the manufacture of the prior art cutting insert, a titanium nitride/titanium carbonitride coating layer is applied to the alpha-alumina coating layer and then removed by blasting whereby the alpha-alumina coating layer experiences reduced tensile residual stress or compressive residual stress.

U.S. Pat. No. 7,153,562 to Rodmar et al. pertains to a coated cutting insert that includes a TiCON layer and wherein the titanium carbonitride is the outer coating layer.

U.S. Pat. No. 6,472,060 to Ruppi et al., as well as related issued U.S. Pat. No. 6,620,498 to Ruppi et al. and U.S. Pat. No. 6,652,913 to Ruppi et al., pertains to a coated cutting insert that includes in the coating scheme a nanocrystalline coating of Ti(C,N,O) applied via a MTCVD process at a temperature that ranges between 700-900° C. See Column 2, lines 36-45.

U.S. Pat. No. 6,015,614 to Ruppi pertains to a multi-layer coating scheme for a cutting insert wherein the process includes a post-coating blasting treatment. The '614 Patent appears to show an α-Al$_2$O$_3$ layer with a bonding layer ((Ti, Al)(C,O,N) thereon, as well as a single or multiple layer TiN scheme on the bonding layer. See Examples Nos. 9 and 10 in Table 3. The multiple layer TiN scheme comprises alternating layers of TiN and TiC. See Example No. 8 in Table 3. The '614 patent includes the step of blasting the surface of the coated insert using Al$_2$O$_3$ particles (320 mesh, medium grain size 30 µm). See Col. 3, line 66 through Col. 4, line 3.

U.S. Pat. No. 7,192,637 to Ruppi et al. pertains to disclose a multi-layer coating scheme for a cutting insert. The '637 Patent appears to show an α-Al$_2$O$_3$ layer with a bonding layer of Ti(C,O,N) (or Ti(C,N) [see Col. 2, lines 37-47]) thereon, as well as a TiN layer on the bonding layer. See Col. 4, lines 31-44. There is a TiCN/TiN coating scheme on the α-Al$_2$O$_3$ layer. See Col. 5, lines 1-3.

U.S. Pat. No. 6,379,798 to Yazaki appears to show an inner Al$_2$O$_3$ layer with a titanium carbonitroxide outermost layer. See Col. 3, lines 8-20. The outermost layer comes off when subjected to mechanical stress to provide wear-indicating properties via color differentiation. See Col. 2, lines 9-38. Along this line, U.S. Pat. No. 7,097,901 to Larsson et al. appears to disclose a layer of TiC$_x$N$_y$O$_z$ on an Al$_2$O$_3$ layer (see Col. 4, lines 55-59), and U.S. Pat. No. 7,132,153 to Zackrisson et al. appears to disclose a layer of TiC$_x$N$_y$O$_z$ on an Al$_2$O$_3$ layer (see Col. 4, lines 56-59).

U.S. Patent Application Publication No. US 2006/0177584 to Gates, Jr., et al. (assigned to the assignee of the present patent application) includes a disclosure of the coating combination of TiAlOCN/TiOCN. See Table 8 (Inventive Heat No. 9). However, this bonding arrangement is below the alumina layer so that the TiAlOCN/TiOCN coating scheme is a part of a modification scheme that is between the outer alumina coating and the inner TiCN coating layer.

U.S. Patent Application Publication No. US 2007/0128469 to Okada et al. presents a general description of the coating scheme that comprises a base coating, an intermediate coating and an outermost coating. In this regard, Paragraphs [0013]-[0021] read in part:

The surface-coated cutting insert of the present invention includes: an insert body having a substrate of tungsten carbide-based cemented carbide, titanium carbonitride-based cermet or ceramics; and a base layer, an intermediate layer and an outermost layer which are provided on a surface of the insert body, in order from the insert body side; wherein a cutting edge is formed at an intersecting edge line region where a rake face and a flank face of the insert body intersect, the base layer and the outermost layer are made of a single layer or two or more layers formed of carbides, nitrides, oxides, or borides of one selected from the group consisting of periodic table Group IVa metals, Group Va metals, Group VIa metals, aluminum and silicon, or complex compounds thereof, and the intermediate layer is formed of primarily $Al_2O_3$, the outermost layer is removed so as to leave primarily the intermediate layer exposed on part of the insert body surface, including at least the flank face and a flank face-side cutting edge portion of the intersecting edge line region that is connected to the flank face, with the outermost layer being left on at least part of the rake face inside a boundary with the intersecting edge line region.

The outermost layer may be removed so as to leave primarily the intermediate layer exposed on the flank face and all of the intersecting edge line region.

The outermost layer may be removed so as to leave primarily the intermediate layer exposed from the flank face to a range inside the rake face from the boundary between the intersecting edge line region and the rake face.

The outermost layer may be removed so as to leave primarily the intermediate layer exposed within a range up to 2 mm inside the rake face from the boundary between the intersecting edge line region and the rake face.

The base layer or the outermost layer or both thereof may have a single layer or two or more layers formed of carbides, nitrides, oxides, or borides of one selected from the group consisting of Ti, Zr, Hf, and Cr, which are selected from periodic table Group IVa metals, Group Va metals, and Group VIa metals, and aluminum and silicon, or complex compounds thereof.

The intermediate layer may be a layer which includes $Al_2O_3$ at a content of 80 vol % or more.

At the flank face and at the flank face-side cutting edge portion, the intermediate layer may be exposed 70% or more of the surface area.

The outermost layer may be removed by wet blasting.]

The '469 Okada et al. publication also appears to present variations of wet blasting to remove a portion of the coating from the as-coated cutting insert. See Paragraphs [0029]-[0033].

U.S. Pat. No. 5,372,873 to Yoshimura et al. discloses the benefits of shot peening a coated cutting insert. The shot peening can convert tensile stresses to compressive stresses. The shot peening can be localized so selected surfaces exhibit selected stress conditions. See Col. 6, lines 32-52. The relevant coating scheme comprises alumina that has a titanium carbonitride layer thereon, which in turn, has a titanium nitride layer thereon. See Col. 8, lines 4-10; Tests 5-8 and 13-16 in Table 2. The '873 Patent is technically along the lines of the following patents: U.S. Pat. No. 5,576,093 to Yoshimura et al., U.S. Pat. No. 5,374,471 to Yoshimura et al., and U.S. Pat. No. 5,681,651 to Yoshimura et al.

U.S. Pat. No. 6,884,496 to Westphal et al. discloses the basic benefits of dry blasting a coated cutting insert wherein there is an increase in the compressive stress. See Col. 2, lines 42-67. U.S. Pat. No. 4,674,365 to Reed discloses a mechanical treatment. U.S. Pat. No. 5,861,210 to Lenander et al., which discloses a $TiC_xN_yO_z$ layer on alumina (see Col. 2, lines 30-43), discloses that it is known to vary the blasting parameters (see Example 1, Col. 4, line 48 through Col. 5, line 11) to achieve different results.

United States Patent Application Publication No. US2006/0257690 to Bjormander (European Patent Application No. 1 717 348 A2 is the European counterpart) pertains to a coated cutting tool insert wherein the post-treatment (preferably blasting or brushing) removes the outermost coating layer on the edge-line and on the rake face.

SUMMARY OF THE INVENTION

In one form thereof, the invention is a coated cutting insert for use in a chip-forming material removal operation wherein the coated cutting insert comprises a substrate that has a flank surface and a rake surface wherein the flank surface intersects the rake surface to form a cutting edge at the intersection. There is a wear-resistant coating scheme that adheres to at least a portion of the substrate. The wear-resistant coating scheme comprises one or more coating layers of one or more of alumina, hafnia and zirconia. There is a wear indicating coating that adheres to at least a portion of the wear-resistant coating scheme. The wear indicating coating comprises $M(O_xC_yN_z)$ wherein M is selected from the group comprising one or more of the following titanium, hafnium, zirconium, chromium, titanium-aluminum alloy, hafnium-aluminum alloy, zirconium-aluminum alloy, chromium-aluminum alloy, and their alloys, and $x>0$, $y \geq 0$, $z \geq 0$ and $y+z>0$.

In another form thereof, the invention is a coated cutting insert for use in a chip-forming material removal operation. The coated cutting insert comprises a substrate that has a flank surface and a rake surface wherein the flank surface intersects the rake surface to form a cutting edge at the intersection. A wear-resistant coating scheme adheres to at least a portion of the substrate wherein the wear-resistant coating scheme comprises one or more coating layers of one or more of alumina, hafnia and zirconia, and the wear-resistant coating scheme exhibiting compressive residual stress. A wear indicating coating adheres to at least a portion of the wear-resistant coating scheme. The wear indicating coating comprises $M(O_xC_yN_z)$ wherein M is selected from the group comprising one or more of the following titanium, hafnium, zirconium, chromium, titanium-aluminum alloy, hafnium-aluminum alloy, zirconium-aluminum alloy, chromium-aluminum alloy, and their alloys, and $x>0$, $y \geq 0$, $z \geq 0$ and $y+z>0$. After use, the wear indicating coating exhibits a visually perceivable color indication of usage.

In yet another form thereof, the invention is a coated cutting insert for use in a chip-forming material removal operation. The coated cutting insert comprises a substrate that has a flank surface and a rake surface wherein the flank surface intersects the rake surface to form a cutting edge at the intersection. There is a wear-resistant coating scheme adhering to at least a portion of the substrate wherein the wear-resistant coating scheme comprises one or more coating layers of one or more of alumina, hafnia and zirconia. There is a first wear indicating coating adhering to at least a portion of the wear-resistant coating scheme on the rake surface wherein the first wear indicating coating has a first visually perceivable color. There is a second wear indicating coating adhering to at least a portion of the wear-resistant coating scheme on the flank surface wherein the second wear indicating coating has a second visually perceivable color.

In still another form thereof, the invention is a method of making a cutting insert with wear indicating comprising the steps of: providing a substrate with an outer alumina coating layer; applying an as-deposited non-wear indicating coating layer to the alumina coating layer; and treating the non-wear indicating coating layer to convert it to a wear indicating coating layer.

In still another form thereof, the invention is a method of making a cutting insert with wear indicating coating comprising the steps of: providing a substrate with an outer alumina coating layer; applying a wear indicating coating scheme to the alumina coating layer wherein the wear-indicating coating scheme has an outermost wear-indicating coating layer having a first thickness; and treating the wear indicating coating scheme so as to partially remove the outermost wear-indicating coating layer whereby the outermost wear-indicating coating layer is of a second thickness, and the first thickness being greater than the second thickness.

BRIEF DESCRIPTION OF THE DRAWINGS

The following is a brief description of the drawings that form a part of this patent application.

DETAILED DESCRIPTION

Figure 1A:
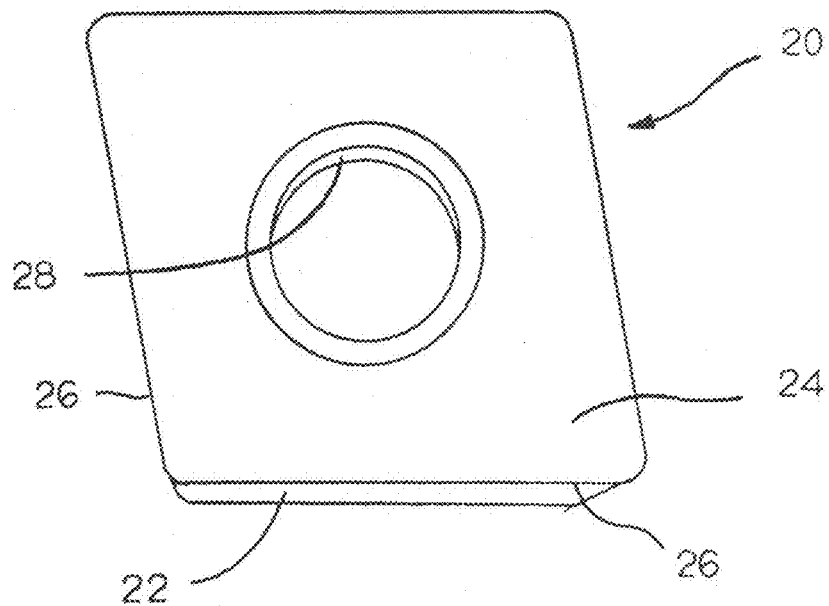
FIG. 1A is an isometric of a specific embodiment of a coated cutting insert of the invention in an unused condition.
Figure 1B:
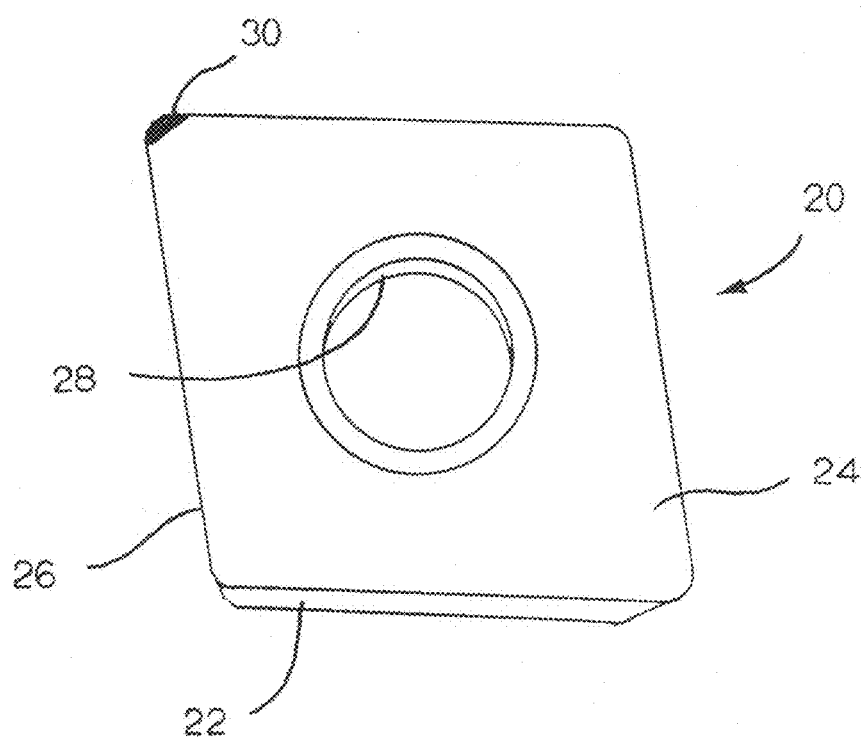
FIG. 1B is an isometric of a specific embodiment of a coated cutting insert of the invention in a used condition wherein the wear-generated removal of the top coating layer presents a visually perceivable indication of usage on the rake face.

Referring to FIGS. 1A and 1B, there is illustrated a cutting insert generally designated as 20. Cutting insert 20 is useful in a chip-forming material removal operation wherein the cutting insert removes material from a workpiece. In regard to the structure of the cutting insert, cutting insert 20 has a plurality of flank surfaces 22 and a rake surface 24 wherein there is a cutting edge 26 at the juncture of each flank surface 22 and the rake surface 24. Cutting insert 20 thus presents a plurality of cutting edges. Cutting insert 20 further contains a central aperture 28 useful for attachment of the cutting insert to a holder.

As mentioned above, the invention pertains to a coated cutting insert 20 with a wear-resistant coating scheme that exhibits wear indication via visually contrasting colors of an outer wear-indicating coating layer that operatively adheres to an alumina coating layer. A comparison of the rake surfaces of the coated cutting inserts illustrated in FIGS. 1A and 1B demonstrates the way the cutting insert exhibits wear indication. There should be an appreciation that the wear-resistant coating scheme can also indicate wear on the flank surface of the cutting insert.

FIG. 1A shows the cutting insert 20 in an unused condition and FIG. 1B shows the cutting insert 20 in a used condition. When in the unused condition, the outer surface of the cutting insert is substantially uniform or consistent in visual appearance. During the chip-forming material removal operation, chips of the workpiece material pass over the surfaces of the cutting insert so that, for example, the top coating layer wears off to expose the underlying alumina coating layer. There is a visually perceivable color contrast between the top coating layer and the alumina coating layer so that in areas of wear, the darker alumina is perceivable in contrast to the unworn (or less worn) areas. The top coating layer may also visually indicate usage through discoloration caused by thermal oxidation wherein there is a contrast in color between the oxidized top coating layer and the non-oxidized top coating layer. The top coating layer may also visually indicate usage through adherence or build-up of workpiece material on the cutting insert wherein there is a color contrast between the built-up workpiece material and the top coating layer. The visually perceivable area that indicates usage, which can be a worn area, a thermally oxidized area or an area with workpiece material build-up, is designated as 30 in FIG. 1B. The operator can thus look at the cutting insert and discern the used cutting edge(s) from the unused cutting edge(s).

Figure 2:
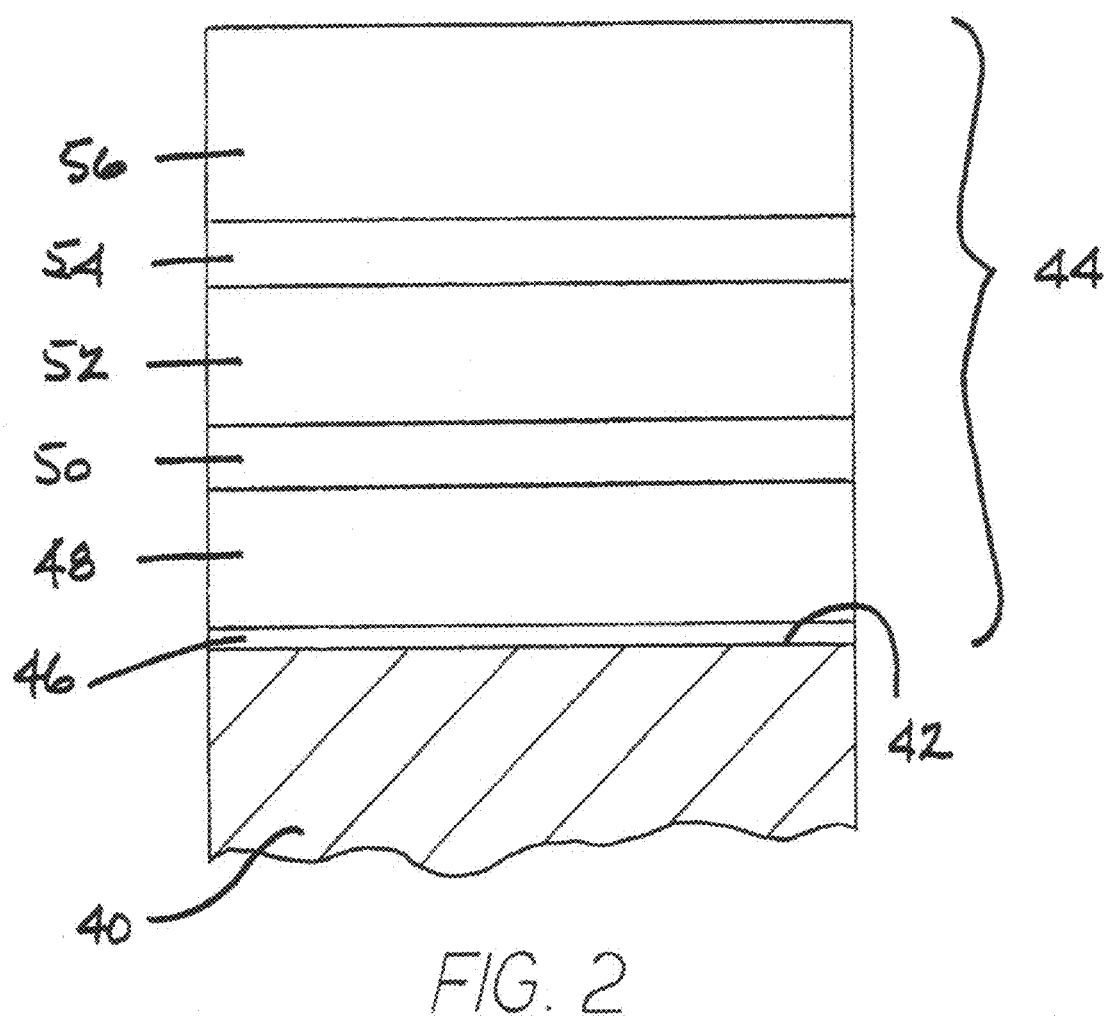
FIG. 2 is a schematic view of a specific coating scheme on the surface of a substrate wherein the top coating layers are applied according to the process parameters of Table 1 hereof.

FIG. 2 shows a schematic of a specific embodiment of the coating scheme of the invention applied by chemical vapor deposition to the surface 42 of a substrate 40 according to the process set forth in Table 1 below. For Table 1, the column identified as "Materials" presents the materials of the coating layer, the column identified as "Temperature Range" presents the temperature range (or temperature) in degrees Centigrade (° C.) for the process step to deposit the corresponding coating layer, the column identified as "Pressure range" presents the pressure range in millibars (mb) for the process step to deposit the corresponding coating layer, and the column identified as "Total Time" presents the total duration in minutes for the process step to deposit the corresponding coating layer, and the column identified as "Gases Present" identifies the gases that were present at one time or another for the process step to deposit the corresponding coating layer.

TABLE 1

Process Parameters for Top Layers of Inventive Coated Cutting Inserts

| Materials | Temperature Range (° C.) | Pressure Range (mbar) | Total Time (minutes) | Gases Present |
|---|---|---|---|---|
| TiOCN | 980-1000 | 200-500 | 50-100 | $H_2 + N_2 + CH_4 + TiCl_4 + CO$ |
| TiCN | 980-1000 | 200-500 | 15 | $H_2 + N_2 + CH_4 + TiCl_4$ |
| TiAlOCN | 980-1000 | 60-150 | 10-25 | $H_2 + N_2 + TiCl_4 + AlCl_3 + CO$ |

Substrate with $\alpha$-$Al_2O_3$ coating layer thereon

The substrates can be made from cemented carbides, carbides, ceramics and cermets. A typical cemented carbide is a cemented (cobalt) tungsten carbide wherein the cobalt content ranges between about 0.2 weight percent and about 15 weight percent. In the case of a cemented (cobalt) tungsten carbide, some of the substrates may exhibit a zone of binder enrichment beginning at and extending inwardly from the surface of the substrate. The cemented carbide substrate may also have the following elements and/or their compounds: titanium, niobium, vanadium, tantalum, chromium, zirconium and/or hafnium. When the substrate is a carbide, there is an absence of a binder alloy (e.g., cobalt).

The ceramic substrates include silicon nitride-based ceramics, SiAlON-based ceramics, titanium carbonitride-based ceramics, titanium diboride-based ceramics, alumina-based ceramics, and aluminum oxynitride-based ceramics. Cermets substrates include cermets that have nickel-cobalt binder and a high level of titanium and could further include tungsten carbide, titanium carbide, and nitrogen.

In regard to the specific embodiment of FIG. 2, the coating scheme (see bracket 44) presents a conventional portion applied by chemical vapor deposition (CVD) wherein the conventional portion comprises:

(A) a titanium nitride base coating layer 46, which has a thickness ranging between greater than 0 micrometers and about 1 micrometers with an alternate range being between greater than 0 micrometers and about 0.5 micrometers, applied to the surface 42 of the substrate 40;

(B) a titanium carbonitride coating layer 48 is applied to the titanium nitride coating layer 46 and wherein the titanium carbonitride coating has a thickness ranging between about 1 micrometer and about 20 micrometers with one alternate range being between about 2 micrometers and about 15 micrometers and still another alternate range being between about 2 micrometers and about 10 micrometers;

(C) a bonding coating layer 50 that contains Ti, Al, O, C and N (as well as some high temperature-CVD titanium carbonitride) applied to the titanium carbonitride coating layer and wherein the bonding coating layer has a thickness ranging between about 0.1 micrometers and about 5 micrometers with an alternate range between about 0.5 micrometers and about 3 micrometers; and (D) an alpha-alumina coating layer 52 applied to the bonding layer 50 and wherein the alpha-alumina coating layer has a thickness ranging between about 1 micrometer and about 20 micrometers with an alternate range being between 2 micrometers and about 15 micrometers and with still another alternate range being between about 4 micrometers and about 12 micrometers.

In reference to the inventive coating, a coating interlayer of titanium aluminum oxycarbonitride 54 is applied by CVD to the surface of the alpha-alumina coating layer 52. The coating interlayer 54 is of a thickness that ranges between greater than 0 micrometers and about 3 micrometers with an alternate range being greater than 0 micrometers and about 1 micrometer.

The outer coating layer of titanium oxycarbonitride 56, which also includes a base portion of titanium carbonitride to provide a base for the nucleation of the outer coating layer of titanium carbonitride, is applied by CVD to the surface of the coating interlayer 54. The titanium oxycarbonitride ($TiO_xC_yN_z$ wherein x>0, y>0 and z>0) coating layer 56 is of a thickness that ranges between about 0.1 micrometers and about 3 micrometers with an alternate range being between about 0.5 micrometers and about 2 micrometers.

In the above description, the alpha-alumina coating layer may be a wear-resistant coating scheme which may comprise one or more layers. In this regard, the wear-resistant coating scheme can comprise one or more coating layers of one or more of alumina, hafnia and zirconia, and the wear-resistant coating scheme exhibiting compressive residual stress wherein one range of the compressive residual stress is between about 100 MPa and about 2000 MPa and an alternate range of compressive residual stress is between about 200 MPa and about 1000 MPa.

In the above description, the outer coating layer is titanium oxycarbonitride. There should be an appreciation that the outer coating layer (or wear indicating coating layer) can comprise $M(O_xC_yN_z)$ wherein M is selected from the group comprising one or more of the following titanium, hafnium, zirconium, chromium, titanium-aluminum alloy, hafnium-aluminum alloy, zirconium-aluminum alloy, chromium-aluminum alloy, and their alloys, and x>0, y≧0, z≧0 and y+z>0. When aluminum is present in the "M" component of the wear indicating layer, it is in combination with another one or more of the other elements (i.e., titanium, hafnium, zirconium, chromium). There should be an appreciation that the outer coating layer can include titanium oxycarbide, titanium oxynitride, titanium aluminum oxycarbide, or titanium aluminum oxynitride.

Figure 3:
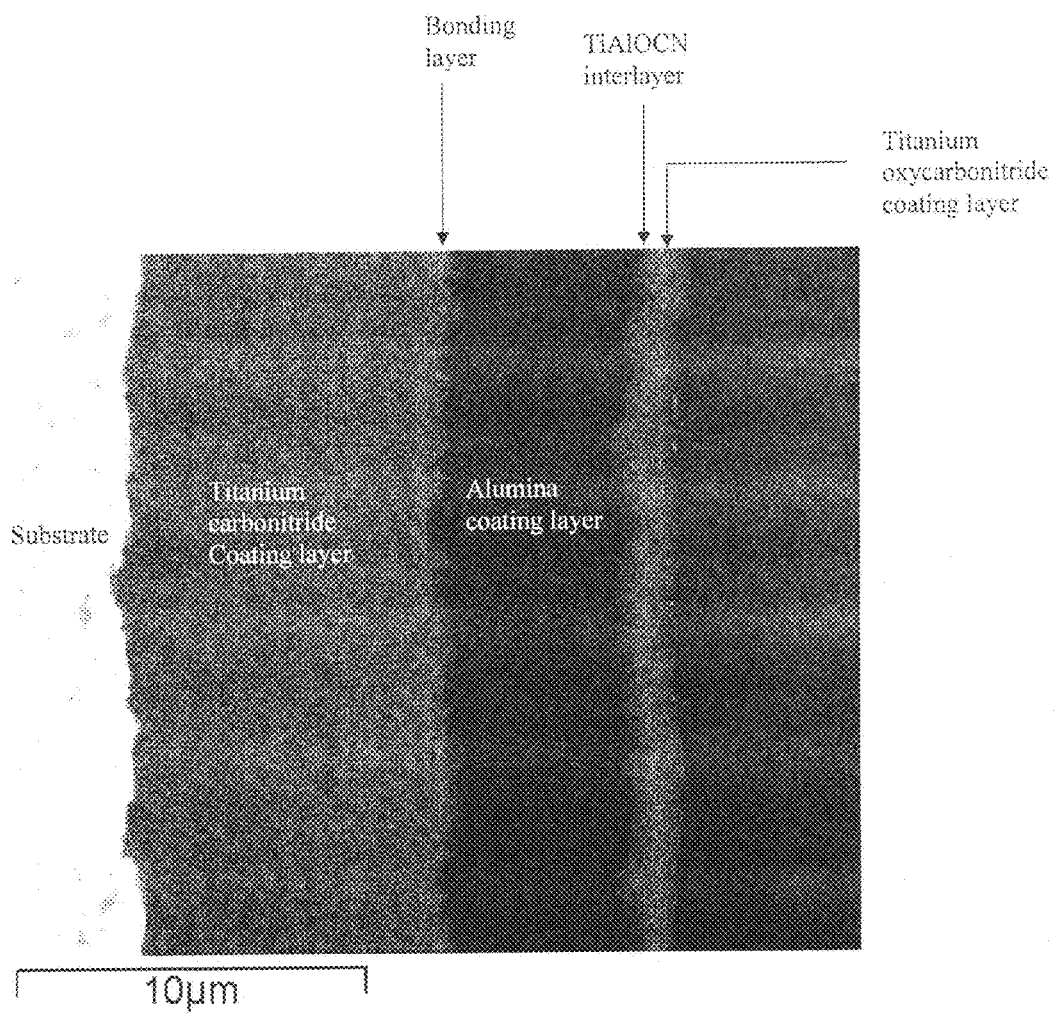
FIG. 3 is a scanning electron microscopy (SEM) black and white photomicrograph in back scattering mode (a scale of 10 micrometers) of the coating scheme for a specific embodiment of the coated cutting insert wherein the substrate, the titanium carbonitride coating layer, the bonding coating layer, the alumina coating layer, the TiAlOCN coating interlayer and the titanium oxycarbonitride top coating later are indicated.

FIG. 3 is a SEM back scattered image (scale of 10 micrometers) that shows a polished substrate/coating cross section of an inventive cutting insert. In FIG. 3, the substrate is a cemented (cobalt) tungsten carbide and exhibits a light color. The substrate has a surface on which there is a light gray titanium carbonitride coating layer. There should be an appreciation that a very thin base layer of titanium nitride exists, but is not visible in the photomicrograph. A bonding layer that contains Al, Ti, O, C and N is on the surface the titanium carbonitride coating layer. A darker alpha-alumina coating layer is on the bonding layer. A titanium aluminum carbo-oxynitride interlayer coating is on the surface of the alpha-alumina coating layer.

Finally, a light gray outer coating layer of titanium oxycarbonitride, which also includes a base layer of titanium carbonitride as a base for nucleation of the titanium oxycarbonitride, is on the titanium aluminum carbo-oxynitride interlayer.

Figure 4A:
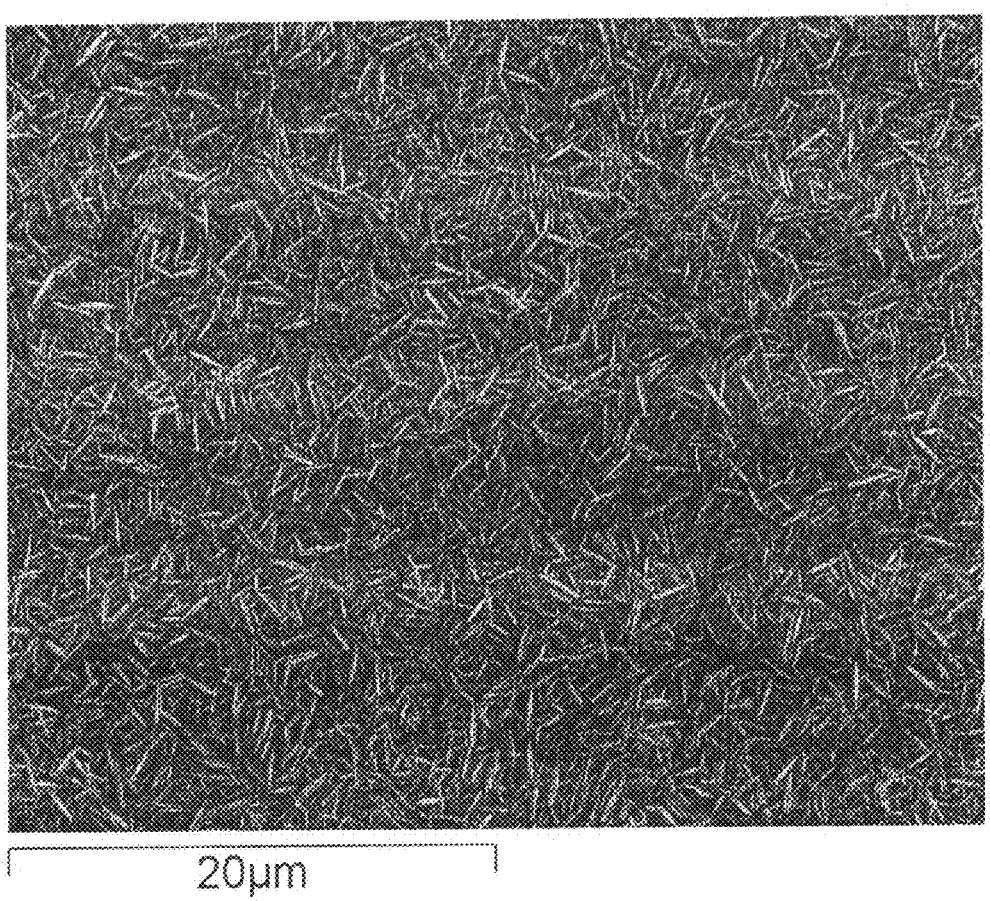
FIG. 4A is a SEM photomicrograph (scale of 20 micrometers) of the surface morphology of a specific embodiment of a cutting insert with an outer coating layer of titanium oxycarbonitride prior to the implementation of the post-coating blasting treatment.
Figure 4B:
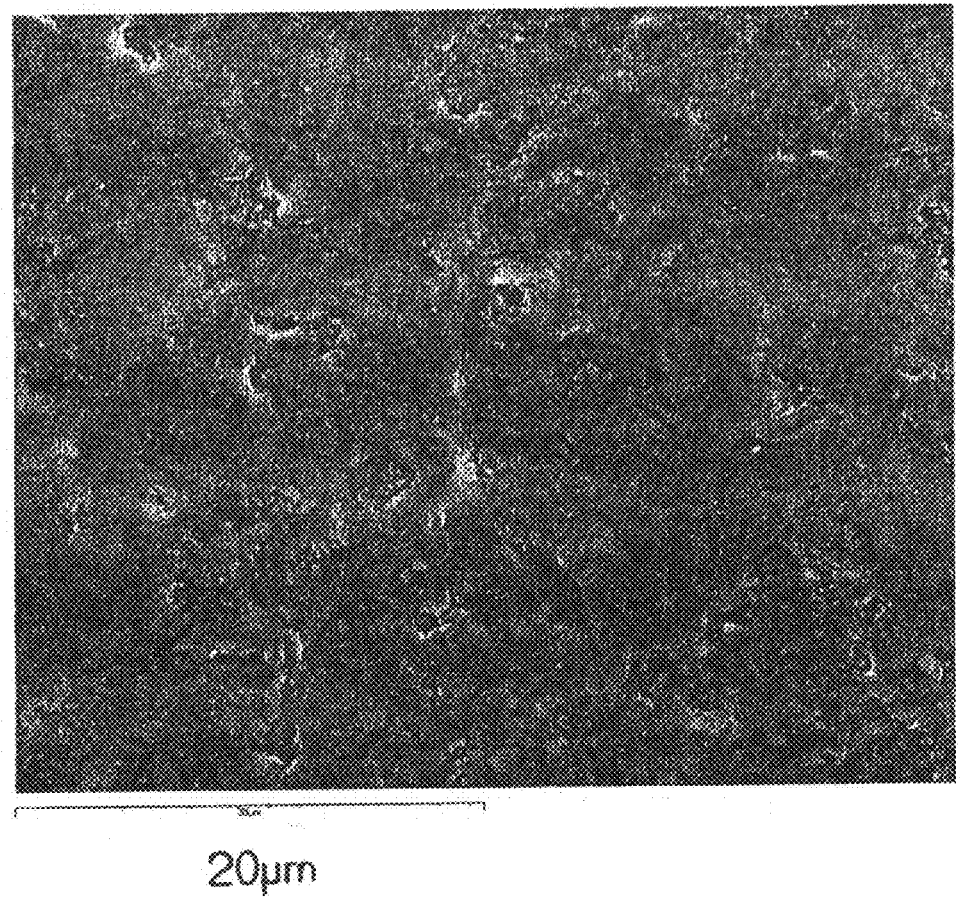
FIG. 4B is a SEM photomicrograph (scale of 20 micrometers) of the surface morphology of a specific embodiment of a cutting insert with an outer coating layer of titanium oxycarbonitride after to the implementation of the post-coating blasting treatment.

FIGS. 4A and 4B are photomicrographs that show the SEM image of the titanium oxycarbonitride top layer. FIG. 4A shows the surface of the titanium oxycarbonitride top layer after coating and prior to subjection to a mechanical post-coating treatment, which in this case is blasting. FIG. 4B shows the surface of the titanium oxycarbonitride top layer after the blasting surface treatment. While wet blasting is preferred, other kinds of blasting treatments can be suitable.

As shown in FIG. 4A, prior to blasting, the titanium oxycarbonitride top layer exhibits platelet morphology with very high two-dimensional aspect ratio. The nature of platelet crystalline structure results in more scattering of the light making the coating surface appear to be black or dark red prior to the blasting surface treatment wherein a coating layer with the black or dark red color surface is not suitable to function as a wear indicating layer. As shown in FIG. 4B, after the blasting surface treatment, the coating surface is smoothened and appears in the actual sample to be of a bronze color wherein a coating layer with a bronze color is suitable as a wear indicating layer. The surface roughness ($R_a$) of the blasted outer surface of two samples of the inventive coated cutting inserts was 340 nm±6 nm for one sample and 352 nm±4 nm for the second sample.

In addition to smoothing the surface of the outer coating layer, the blasting treatment converts the as-deposited outer coating layer from a coating layer not suitable to be a wear indicating layer into a coating layer that is suitable to be a wear indicating coating layer. The blasting the surface of the outer coating layer resulted in a change in the color of the coating layer from a black or dark red (i.e., a dark color) to a bronze (i.e., a lighter color). There should be an appreciation that a coating layer with a dark color is unsuitable as a wear indicating layer and a coating layer with a lighter color is suitable as a wear indicating coating layer. When the outer coating layer is a lighter color, it is able to provide an indication of wear through any one or more of the following mechanisms that occur during use: discoloration of the cutting insert, build-up of the workpiece material on the cutting insert, or the removal of the outer coating layer to expose the alumina coating layer which has a visually perceivable color contrast with the outer coating layer.

Still another result of blasting is the reduction of the tensile residual stress levels in the alumina coating layer from the levels extant in the as-deposited alumina coating layer. The reduction can be such to reduce the amount of tensile residual stress wherein the stress remains tensile or it can be such to reduce the residual stresses into being compressive residual stress.

Figure 5A:
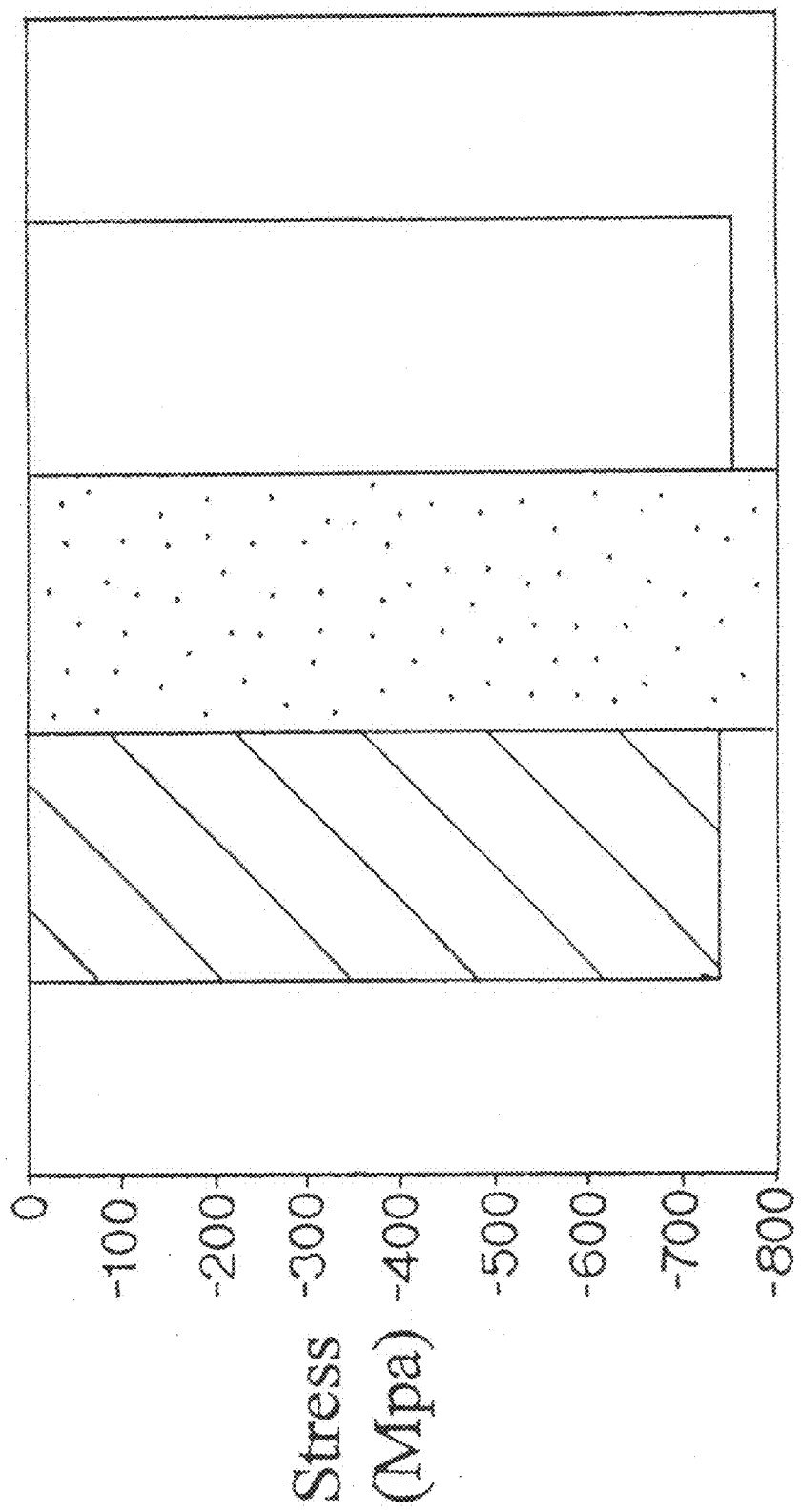
FIG. 5A is a bar diagram that shows the magnitude of the compressive stress as measured by an x-ray diffraction technique in the alumina coating for two samples of a prior art coated cutting insert wherein the two samples are shown as cross-hatched and dotted and the average compressive stress is unmarked.
Figure 5B:
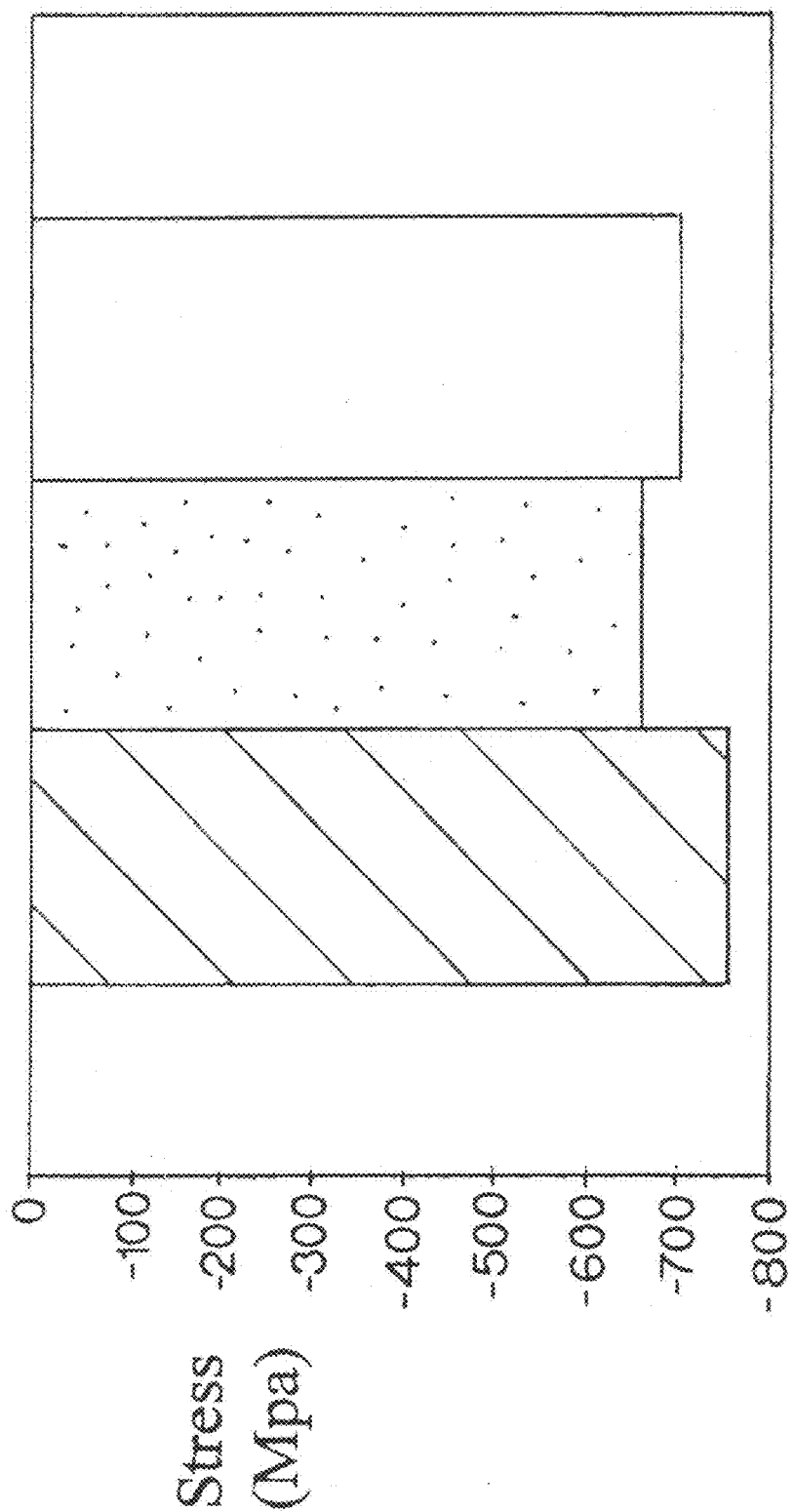
FIG. 5B is a bar diagram that shows the magnitude of the compressive stress (after the post-coating blasting treatment) as measured by an x-ray diffraction technique in the alumina coating for two samples of the inventive cutting insert and wherein the two samples are shown as cross-hatched and dotted and the average compressive stress is unmarked.

In reference to the impact of the use of the post-coating blasting treatment to reduce the residual stresses present in the alumina coating layer after coating, FIG. 5A is a bar diagram that shows the magnitude of the compressive stress as measured by an x-ray diffraction technique in the alumina coating for two samples of a prior art cutting insert. In FIG. 5A, the two prior art samples are shown by the bars that are cross-hatched and dotted and the average compressive stress is shown by the unmarked bar. FIG. 5B is a bar diagram that shows the magnitude of the compressive stress (after the post-coating blasting treatment) in the alumina coating layer as measured by an x-ray diffraction technique for two samples of the inventive cutting insert. In FIG. 5B, the two inventive samples are shown by the bars that are cross-hatched and dotted and the average compressive stress is shown by the unmarked bar. For each one of FIGS. 5A and 5B, the stress is reported in MPa.

As shown by FIG. 5B, the compressive residual stress in the alumina for the inventive samples is in the range of between about −650 MPa and −800 MPa. While the maximum amount of compressive stress can vary depending upon the coating composition, the coating thickness, the coating application technique, or the coating-substrate thermal coefficient of expansion mismatch, it is contemplated that the maximum compressive stress is about 2 GPa. There should be an appreciation that the compressive residual stress in the alumina coating layer of the inventive samples is in the same range as the compressive residual stress in the alumina coating layer of the prior art cutting inserts; however, in the case of the present invention, the outer wear indicating layer remains in place through the blasting treatment in contrast to the prior art cutting insert due to the improved bond strength to the alumina of the outer coating layer of the invention, as well as improved abrasion resistance of the outer coating layer to the blasting process.

The XRD residual stress in the alumina coating layer was measured by a Psi tilt method and the reflection (024) in the alumina coating layer was chosen for the measurement. Psi tilts of 0, 33.9, 52.1 and 75 degrees were selected for the measurement of the residual stress levels. Positive and negative Psi tilts were chosen to supply the data required to determine possible shear stresses. Additionally, three Phi rotation angles were selected (0, 45, and 90) to provide the data required to determine the biaxial stress state of the material.

Biaxial stress calculations were completed using the following equation:

$$\frac{d_{\varphi\psi} - d_0}{d_0} = S_1(\sigma_1 + \sigma_2) + \frac{1}{2}S_2 \sigma_\varphi \sin^2\psi$$

where:
$S_1$ and $\tfrac{1}{2}S_2$ are the x-ray elastic constants
$d_{\varphi\psi}$ measured peak d-spacing for the Psi tilt and Phi rotation
$d_0$ stress free peak d-spacing for diffracted reflection $$\sigma_{100} = \sigma_1 \cos^2\varphi + \sigma_2 \sin^2\varphi$$

Figure 6:
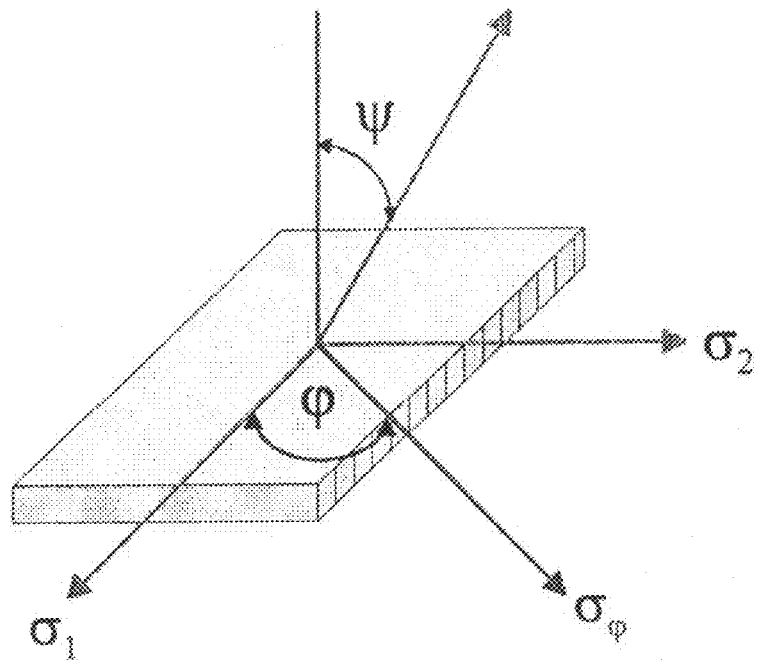
FIG. 6 is a drawing that illustrates the Psi method of measuring stress in the alumina coating layer.

$\sigma_1$ and $\sigma_2$ are the primary stresses
The relationship of the various tilt and rotation angles in this method is shown in FIG. 6. Young's Modulus (E) is taken to be 401 GPa, Poisson's Ratio (ν) is taken to be 0.22, and x-ray elastic constants ($S_1$ and $S_2$) are taken to be $-0.53 \times 10^6$ mm$^2$/N and $2.94 \times 10^6$ mm$^2$/N respectively for calculation of stress in $Al_2O_3$ coating.

Cutting tests were conducted to compare the inventive coated cutting inserts against the prior art cutting inserts. The inventive cutting inserts in these tests were made according to the process set forth in Table 1. The prior art cutting insert exhibited a coating scheme like that of the inventive samples, except that the outer layer of the prior art cutting inserts comprised alpha-alumina that had been blasted to reduce the residual to compressive residual stress. Prior to the blasting of the prior art cutting inserts, the alumina coating layer was covered by a TiN/TiCN layer. However, the blasting removed the TiN/TiCN layer to expose the alumina coating layer as the black outer layer.

The substrates for both the prior art cutting inserts and the inventive cutting inserts comprised cemented (cobalt) tungsten carbide with the following approximate composition: 1.8 weight percent tantalum, 0.4 weight percent titanium, 0.3 weight percent niobium, 6 weight percent cobalt and the balance tungsten carbide and recognized impurities.

In reference to the metalcutting tests, the parameters of test were as follows:

| | |
|---|---|
| Insert style: | CNMA432 |
| Lead angle: | −5 degree |
| Work piece materials: | 80-55-06 ductile iron |
| Operation: | Wet turning cycle interrupted cut |
| Speed: | 656 surface feet per minute |
| Feed rate: | 0.004 inch per revolution |
| Depth of cut: | 0.08 inch |

The failure criteria were: flank wear, nose wear and depth of cut notching (DOCN) equal to 0.012 inches (0.0305 millimeters). For these tests, the failure mode was depth of cut notching and flank wear. The test results are set out in Table 2 and Table 3.

TABLE 2

Tool life test result (in minutes) for Prior Art Cutting Inserts and Inventive Cutting Inserts

| Test candidates | Rep. 1 | Rep. 2 | Average of tool life |
|---|---|---|---|
| Prior Art Insert | 7.3 | 7.0 | 7.2 |
| Inventive Insert | 9.4 | 7.4 | 8.4 |

TABLE 3

Tool life test result (in minutes) for Prior Art Cutting Inserts and Inventive Cutting Inserts

| Test candidates | Rep. 1 | Rep. 2 | Rep. 3 | Average of tool life |
|---|---|---|---|---|
| Prior Art Insert | 11.5 | 16.6 | 10.7 | 13.0 |
| Inventive Insert | 12.5 | 12.9 | 9.7 | 11.7 |

Table 2 and Table 3 indicate that the cutting insert of the invention shows similar tool life on the average with the prior art cutting insert. However, The cutting insert of the invention possesses better edge identification ability compared to prior art cutting insert.

One should appreciate that in certain circumstances, there are advantages extant due to the rake surface being of a different visually perceivable color than the flank surface(s) of the coated cutting insert. Typically, this is due to a difference in the composition of the coating at the respective surface of the coated cutting insert. Advantages connected with difference in the visually perceivable color include, without limitation, cosmetic appeal of the cutting insert, ability to provide for visual grade identification, and the ability to provide for different surface roughness and internal stress associated with different compositions, which one can engineer to suit different applications.

Figure 7:
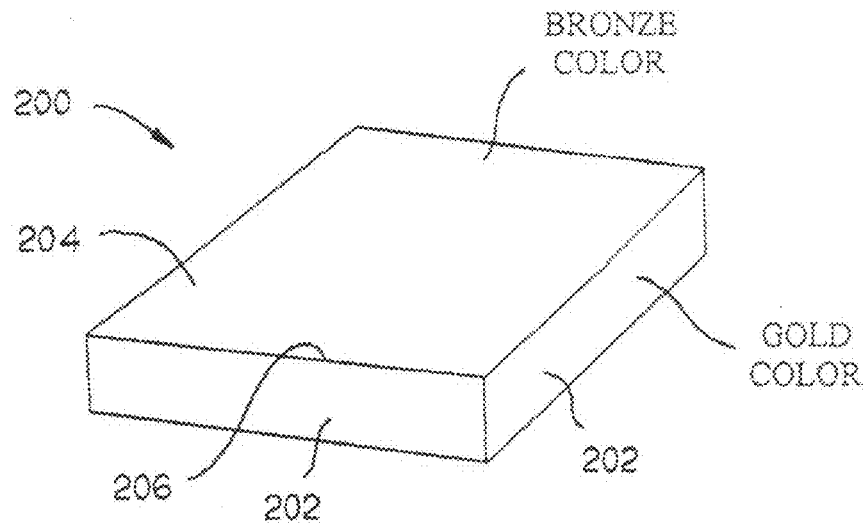
FIG. 7 is an isometric view of a specific embodiment of a coated cutting insert of the invention wherein the rake surface has one visually perceivable color and the flank surfaces have another visually perceivable color.
Figure 8:
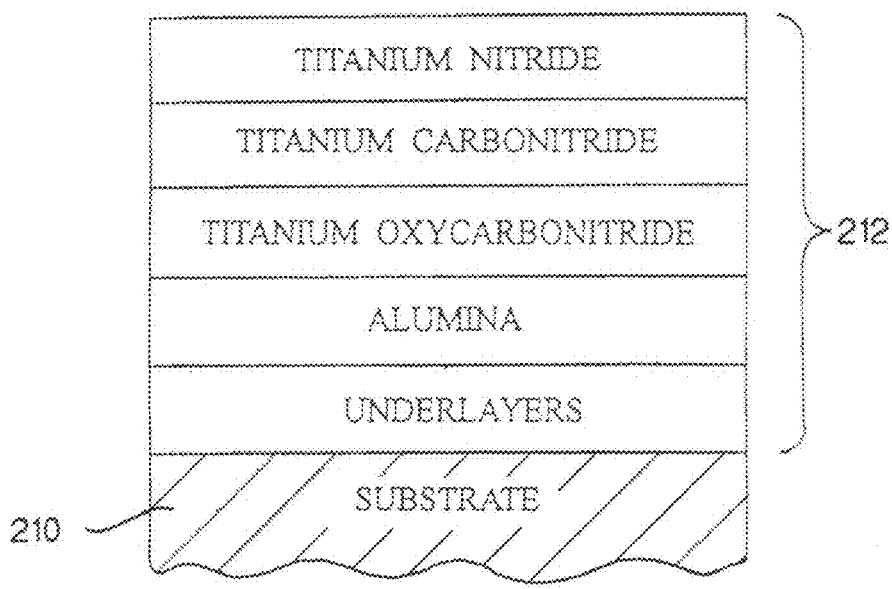
FIG. 8 is a schematic view of a specific coating scheme on the rake surface of a substrate of FIG. 7.
Figure 9:
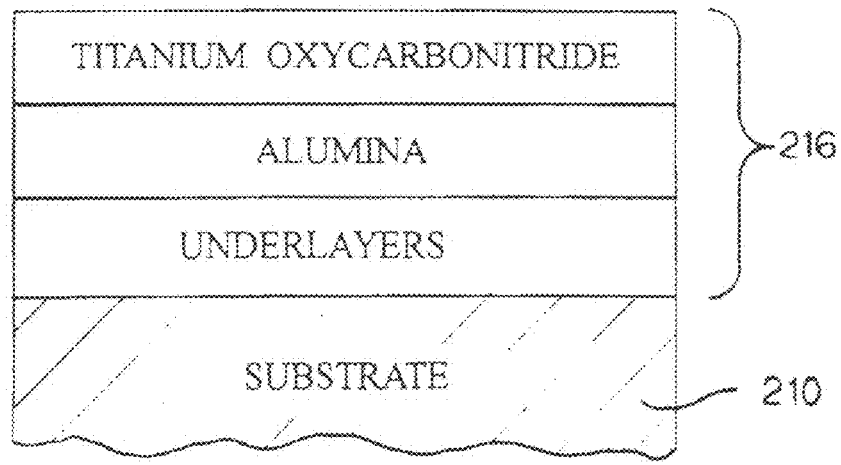
FIG. 9 is a schematic view of a specific coating scheme on the flank surface of a substrate of FIG. 7.

Different techniques can be useful to make a coated cutting insert in which there is a difference in the composition between the rake surface and the flank surface(s). The specific coated cutting insert of FIGS. 7-9 shows the use of a mechanical surface treatment (e.g., dry blasting using alumina grit or wet blasting) to result in a coated cutting insert in which the rake surface has a different composition from the flank surface(s). The difference in the composition leads to a difference in the visually perceivable color on those surfaces. While treatment techniques exist, the extent of the surface treatment can lead to surfaces with different visually perceivable colors. For example, a surface of a cutting insert can be treated to one extent to result in a surface that exhibits one visually perceivable color. Another surface of the same cutting insert can be treated to another extent to result in a surface that exhibits another visually perceivable color.

Referring to FIG. 7, there is illustrated a specific embodiment of a coated cutting insert generally designated as 200. Coated cutting insert 200 includes flank surfaces 202 and a rake surface 204. The flanks surfaces 202 intersect the rake surface 204 whereby there is a cutting edge 206 at the intersection thereof.

As shown in FIG. 7, the rake surface 204 has a visually perceivable bronze color and the flank surfaces 202 each have a visually perceivable gold color. As described herein, the difference in the visually perceivable color of the rake surface and the flank surfaces is due to the difference in the composition at these surfaces (i.e., rake surface 204 and flank surfaces 202).

Figure 7A:
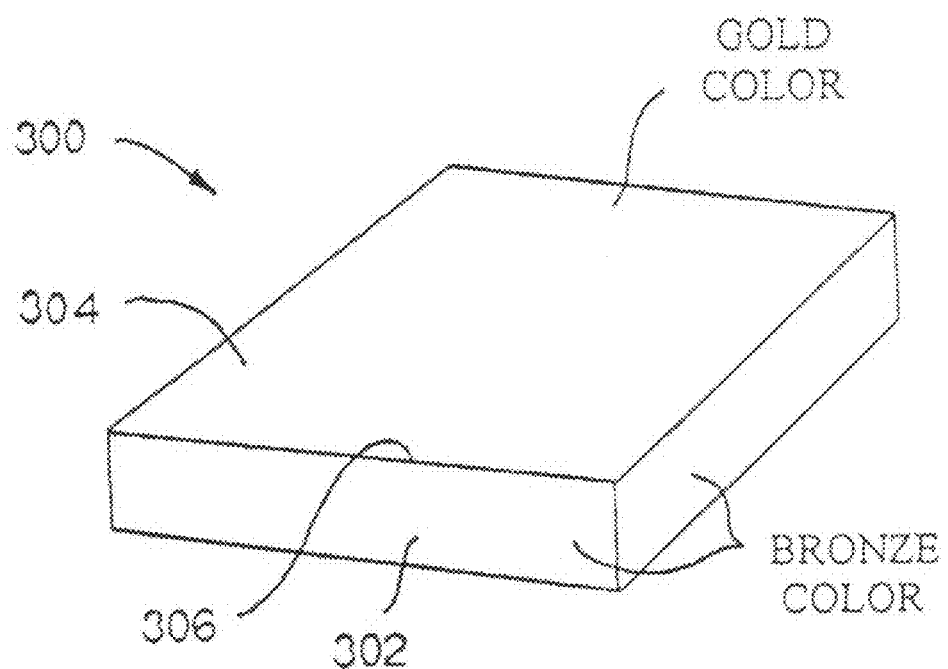
FIG. 7A is an isometric view of a specific embodiment of a coated cutting insert of the invention wherein the rake surface has one visually perceivable color (e.g., gold color) and the flank surfaces have another visually perceivable color (e.g., bronze color)

Referring to FIG. 7A, there is illustrated a specific embodiment of a coated cutting insert generally designated as 300. Coated cutting insert 300 includes flank surfaces 302 and a rake surface 304. The flanks surfaces 302 intersect the rake surface 304 whereby there is a cutting edge 306 at the intersection thereof. As shown in FIG. 7A, the rake surface 304 has a visually perceivable gold color and the flank surfaces 302 each have a visually perceivable bronze color. As described herein, the difference in the visually perceivable color of the rake surface and the flank surfaces is due to the difference in the composition at these surfaces (i.e., rake surface 304 and flank surfaces 302).

FIG. 8 is a schematic view of the coating scheme, which is generally designated as 212, that is on the flank surfaces of the substrate 210 of the coated cutting insert 200. The coating scheme 212 includes an underlayer coating arrangement (designated as UNDERLAYERS in FIG. 8). An exemplary underlayer coating arrangement comprises:

(A) a titanium nitride base coating layer, which has a thickness ranging between greater than 0 micrometers and about 1 micrometers with an alternate range being between greater than 0 micrometers and about 0.5 micrometers, applied to the surface of a substrate;

(B) a titanium carbonitride coating layer is applied to the titanium nitride coating layer and wherein the titanium carbonitride coating has a thickness ranging between about 1 micrometer and about 20 micrometers with one alternate range being between about 2 micrometers and about 15 micrometers and still another alternate range being between about 2 micrometers and about 10 micrometers; and (C) a bonding coating layer that contains Ti, Al, O, C and N (as well as some high temperature-CVD titanium carbonitride) applied to the titanium carbonitride coating layer and wherein the bonding coating layer has a thickness ranging between about 0.1 micrometers and about 5 micrometers with an alternate range between about 0.5 micrometers and about 3 micrometers.

On top of the underlayer coating arrangement is an alumina coating layer (designated as ALUMINA in FIG. 8) wherein the typical technique used to apply this coating layer is chemical vapor deposition (CVD). The alumina coating arrangement may comprise a single coating layer of alumina or, in the alternative, it may comprise a plurality of alumina coating layers. The alumina coating layer(s) is a wear-resistant coating layer arrangement.

A titanium oxycarbonitride coating layer (designated as TITANIUM OXYCARBONITRIDE in FIG. 8) is on the outermost surface of the alumina coating layer(s) wherein the typical technique used to apply this coating layer is chemical vapor deposition (CVD). The titanium oxycarbonitride coating layer is expected to improve the adhesion of the outermost coating layers (i.e., titanium carbonitride coating layer/titanium nitride coating layer) described hereinafter. A titanium carbonitride coating layer (designated as TITANIUM CARBONITRIDE in FIG. 8) is on the surface of the titanium oxycarbonitride coating layer wherein the typical technique used to apply this coating layer is chemical vapor deposition (CVD). A titanium nitride coating layer (designated as TITANIUM NITRIDE in FIG. 8) is on the surface of the titanium carbonitride coating layer wherein the typical technique used to apply this coating layer is chemical vapor deposition (CVD). In this specific embodiment, the titanium nitride coating layer exhibits a visually perceivable gold color.

FIG. 9 is a schematic view of the coating scheme, which is generally designated as 216, that is on the rake surface of the substrate 210 of the coated cutting insert 200. The coating scheme 216 is the resultant coating scheme after coating scheme 212, which was originally on the rake surface, has been subjected to a surface treatment via blasting (e.g., wet blasting or dry blasting) to remove the titanium nitride coating layer and the titanium carbonitride coating layer. As a result of the surface treatment, the alumina coating layer(s) are under reduced tensile stress or actually under compressive stresses due to the surface treatment applied to the rake surface. The surface treatment is expected to improve the edge toughness of the coated cutting insert. This is especially the case for use of the coated cutting insert when used in an interrupted cutting application. In this specific embodiment, the titanium oxycarbonitride coating layer exhibits a visually perceivable bronze color. One can characterize the wear indicating coating as comprising $M1(O_xC_yN_z)$ wherein M1 is selected from the group comprising one or more of the following titanium, hafnium, zirconium, chromium, titanium-aluminum alloy, hafnium-aluminum alloy, zirconium-aluminum alloy, chromium-aluminum alloy, and their alloys, and $x>0$, $y>0$, $z>0$.

It is apparent that the coated cutting insert 200 has different visually perceivable colors on the rake surface and the flank surface(s). The difference is due to the mechanical treatment via blasting of the rake surface to remove the titanium carbonitride coating layer/titanium nitride coating layer to expose the titanium oxycarbonitride. The titanium nitride has a gold color in contrast to the titanium oxycarbonitride, which has a bronze color. One can characterize the wear indicating coating as comprising M2(N) wherein M2 is selected from the group comprising one or more of the following titanium, hafnium, zirconium, chromium, titanium-aluminum alloy, hafnium-aluminum alloy, zirconium-aluminum alloy, chromium-aluminum alloy, and their alloys.

Figure 10:
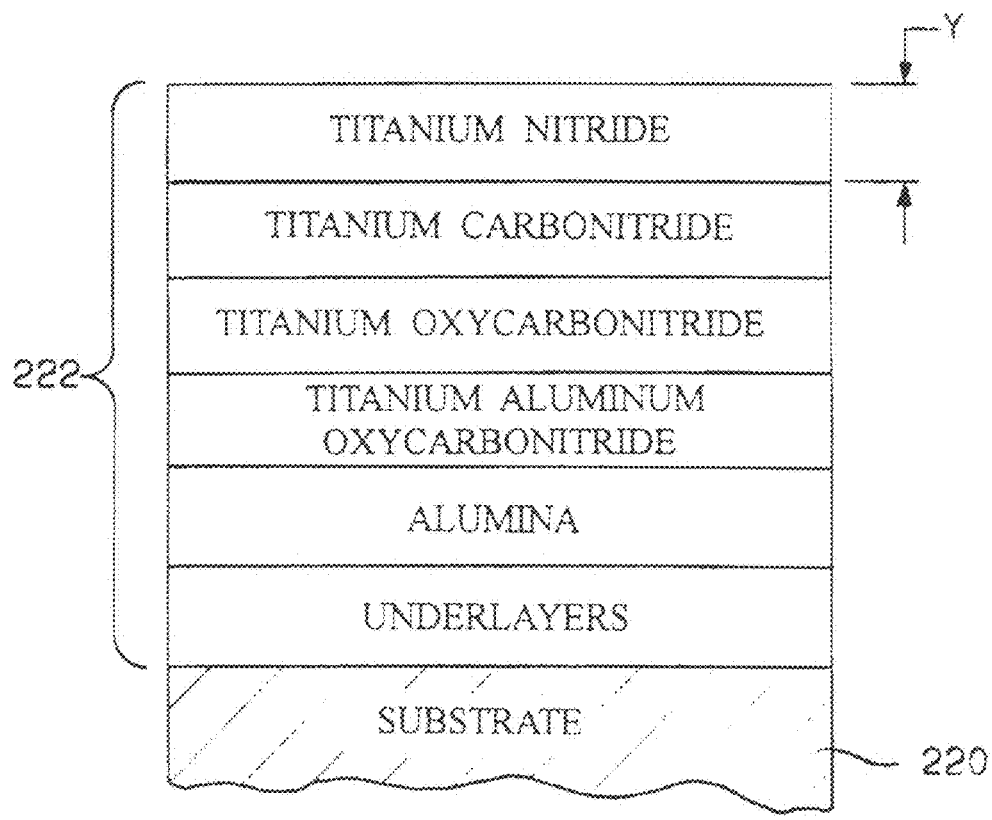
FIG. 10 is a schematic view of a specific coating scheme on the surface of a substrate wherein the coating scheme has not been subjected to a treatment.

FIG. 10 is a schematic view of a specific coating scheme, which is generally designated as 222, that is on a selected surface of a substrate 220 of a specific embodiment of a coated cutting insert. One should appreciate that the coating scheme in the condition of FIG. 10 can exist on all of the surfaces of the cutting insert (or at least on the rake surface and/or flank surface(s)). In the alternative, the coating scheme 222 can be treated to remove the titanium nitride coating/titanium carbonitride coating to expose the titanium oxycarbonitride coating layer. In this arrangement, the titanium oxycarbonitride coating layer is on a titanium aluminum oxycarbonitride coating layer.

The coating scheme 222 includes a CVD underlayer coating arrangement (designated as UNDERLAYERS in FIG. 10) that is like the underlayer coating scheme described in conjunction with FIG. 8 hereof. On top of the underlayer coating arrangement is a CVD alumina coating layer (designated as ALUMINA in FIG. 10). The alumina coating arrangement may comprise a single coating layer of alumina or, in the alternative, it may comprise a plurality of alumina coating layers. The alumina coating layer(s) is a wear-resistant coating layer arrangement.

A CVD titanium aluminum oxycarbonitride coating layer (designated as TITANIUM ALUMINUM OXYCARBONITRIDE in FIG. 10) is on the outermost surface of the alumina coating layer(s). A CVD titanium oxycarbonitride coating layer (designated as TITANIUM OXYCARBONITRIDE in FIG. 10) is on the surface of the alumina coating layer(s). The titanium aluminum oxycarbonitride coating layer/titanium oxycarbonitride coating layer combination is expected to improve adhesion of the outermost coating layers (i.e., titanium carbonitride/titanium nitride) described hereinafter.

A CVD titanium carbonitride coating layer (designated as TITANIUM CARBONITRIDE in FIG. 10) is on the surface of the titanium oxycarbonitride coating layer. A CVD titanium nitride coating layer (designated as TITANIUM NITRIDE in FIG. 10) is on the surface of the titanium carbonitride coating layer. The thickness of the titanium nitride coating layer is "Y". In this specific embodiment, the titanium nitride coating layer exhibits a visually perceivable gold color.

Figure 11:
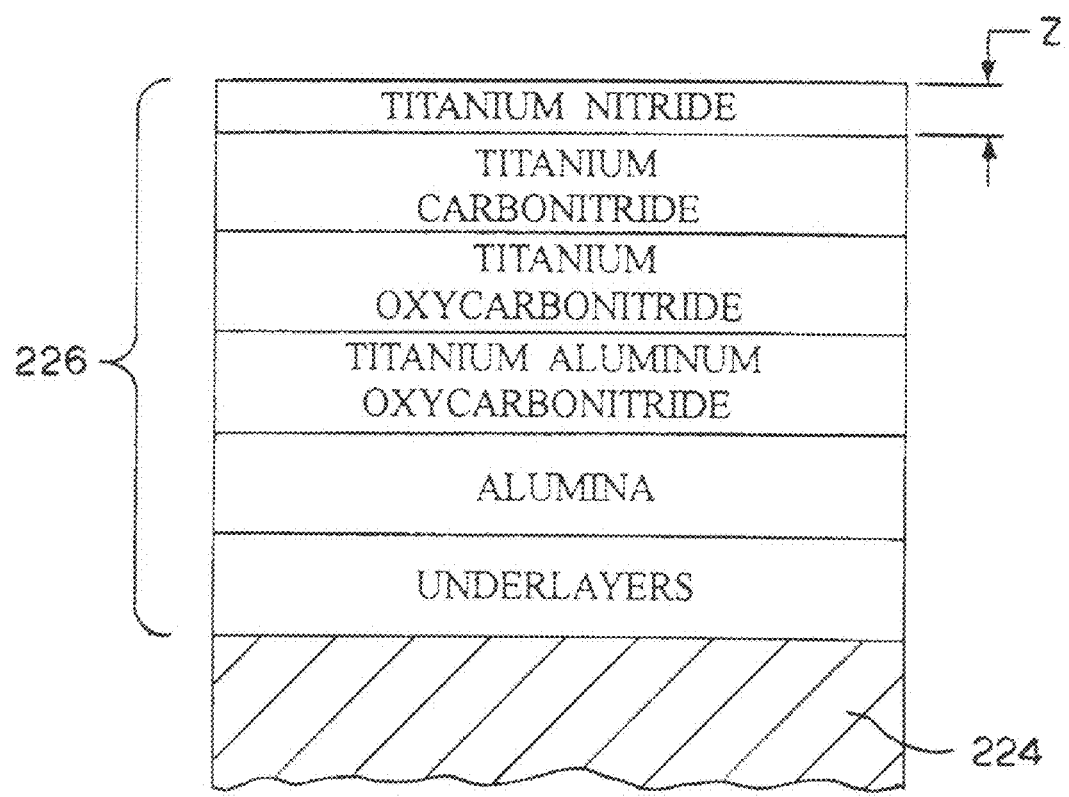
FIG. 11 is a schematic view of the specific coating scheme of FIG. 10 after the coating scheme has been subjected to a surface treatment.

In some situations, a surface of the coated cutting insert is not subjected to a surface treatment. As mentioned above, this is the case for the coating scheme as illustrated in FIG. 10. In other situations, there exist advantages associated with the partial removal of an outer coating layer. The outer coating layer can be removed from both the rake surface and the flank surface(s) or from only a selected area of there surfaces. FIG. 11 illustrates a coating scheme like the coating scheme of FIG. 10, except that the outermost coating layer (i.e., titanium nitride coating layer) has been partially removed via a surface treatment (e.g., blasting).

FIG. 11 is a schematic view of the coating scheme, which is generally designated as 226, that is on a selected surface of a substrate 224 of a specific embodiment of a coated cutting insert. The coating scheme 226 includes a CVD underlayer coating arrangement (designated as UNDERLAYERS in FIG. 11) that is like the underlayer coating scheme described in conjunction with FIG. 8 hereof.

On top of the underlayer coating arrangement is a CVD alumina coating layer (designated as ALUMINA in FIG. 11). The alumina coating arrangement may comprise a single coating layer of alumina or, in the alternative, it may comprise a plurality of alumina coating layers. The alumina coating layer(s) is a wear-resistant coating layer arrangement.

A CVD titanium aluminum oxycarbonitride coating layer (designated as TITANIUM ALUMINUM OXYCARBONITRIDE in FIG. 11) is on the outermost surface of the alumina coating layer(s). A CVD titanium oxycarbonitride coating layer (designated as TITANIUM OXYCARBONITRIDE in FIG. 11) is on the surface of the alumina coating layer(s).

A CVD titanium carbonitride coating layer (designated as TITANIUM CARBONITRIDE in FIG. 11) is on the surface of the titanium oxycarbonitride coating layer. A titanium nitride coating layer (designated as TITANIUM NITRIDE in FIG. 11) is on the surface of the titanium carbonitride coating layer. The thickness of the titanium nitride coating layer is "Z". In this specific embodiment, the titanium nitride coating layer exhibits a visually perceivable gold color.

In comparing the thickness of the titanium nitride coating layer of the embodiments of FIGS. 10 and 11, it is apparent that the dimension Y is greater than the dimension Z. In this situation, the coating scheme 226 was subjected to blasting which partially removes the outer titanium nitride coating layer. Thus, the thickness Z is less than the thickness Y of the titanium nitride coating layer prior to blasting.

It can be appreciated that the present invention provides an improved coating cutting insert with wear (or usage) indication properties. These properties utilize a color contrast on the wear indicating coating layer, which in the unused condition presents substantially uniform or consistent visual appearance. However, if during usage the wear indicating coating layer is removed to expose the underlying wear-resistant coating layer (e.g., an alumina coating layer), there is a visually perceivable color contrast between the top coating layer and the alumina coating layer to indicate usage or wear. The top coating layer may also visually indicate usage through discoloration caused by thermal oxidation wherein there is a contrast in color between the oxidized top coating layer and the non-oxidized top coating layer. The top coating layer may also visually indicate usage through adherence or build-up of workpiece material on the cutting insert wherein there is a color contrast between the built-up workpiece material and the top coating layer. The operator can thus look at the cutting insert and discern the used cutting edge(s) from the unused cutting edge(s).

Further, the present invention provides such a cutting insert that exhibits a smooth surface. In addition, the present invention provides a cutting insert that enhances useful tool life, as well as has both wear indication properties and a smooth surface.

All patents, patent applications, articles and other documents identified herein are hereby incorporated by reference herein. Other embodiments of the invention may be apparent to those skilled in the art from a consideration of the specification or the practice of the invention disclosed herein. It is intended that the specification and any examples set forth herein be considered as illustrative only, with the true spirit and scope of the invention being indicated by the following claims.

What is claimed is:

1. A coated cutting insert for use in a chip-forming material removal operation, the coated cutting insert comprising:
    a substrate having a flank surface and a rake surface wherein the flank surface intersects the rake surface to form a cutting edge at the intersection;
    a wear-resistant coating scheme adhering to at least a portion of the substrate, and the wear-resistant coating scheme comprising one or more coating layers of one or more of alumina, hafnia and zirconia;
    a wear indicating coating adhering to at least a portion of the wear-resistant coating scheme, and the wear indicating coating comprising $M(O_xC_yN_z)$ wherein M is selected from the group comprising one or more of the following titanium, hafnium, zirconium, chromium, titanium-aluminum alloy, hafnium-aluminum alloy, zirconium-aluminum alloy, chromium-aluminum alloy, and their alloys, and $x>0$, $y\geq0$, $z\geq0$ and $y+z>0$; and
    wherein the wear-indicating coating existing on the rake surface of the substrate being of one visually perceivable color and the wear-indicating coating existing on the flank surface of the substrate being of another visually perceivable color, and at least one of the wear-indicating coating on the rake surface and the wear-indicating coating on the flank surface comprising a mechanically treated coating layer wherein the mechanical treatment lightens the color of the as-deposited coating layer from a color unsuitable as a wear indicator to a visually perceivable color suitable as a wear indicator.

2. The coated cutting insert according to claim 1 wherein for the wear-indicating coating on the rake surface, M is titanium and $y>0$ and $z>0$; and for the wear indicating coating on the flank surface, the outermost coating layer comprises titanium nitride.

3. A coated cutting insert for use in a chip-forming material removal operation, the coated cutting insert comprising:
    a substrate having a flank surface and a rake surface wherein the flank surface intersects the rake surface to form a cutting edge at the intersection;
    a wear-resistant coating scheme adhering to at least a portion of the substrate, and the wear-resistant coating scheme comprising one or more coating layers of one or more of alumina, hafnia and zirconia; and
    a first wear indicating coating adhering to at least a portion of the wear-resistant coating scheme on the rake surface, and the first wear indicating coating having a first visually perceivable color, and a second wear indicating coating adhering to at least a portion of the wear-resistant coating scheme on the flank surface, and the second wear indicating coating having a second visually perceivable color, and at least one of the first wear indicating coating on the rake surface and the second wear indicating coating on the flank surface comprising a mechanically treated coating layer wherein the mechanical treatment lightens the color of the as-deposited coating layer from a color unsuitable as a wear indicator to a visually perceivable color suitable as a wear indicator.

4. The coated cutting insert according to claim 3 wherein the first wear indicating coating comprising $M1(O_xC_yN_z)$ wherein M1 is selected from the group comprising one or more of the following titanium, hafnium, zirconium, chromium, titanium-aluminum alloy, hafnium-aluminum alloy, zirconium-aluminum alloy, chromium-aluminum alloy, and their alloys, and $x>0$, $y>0$, $z>0$; and the second wear indicating coating comprising $M2(N)$ wherein M2 is selected from the group comprising one or more of the following titanium, hafnium, zirconium, chromium, titanium-aluminum alloy, hafnium-aluminum alloy, zirconium-aluminum alloy, chromium-aluminum alloy, and their alloys.

5. A coated cutting insert for use in a chip-forming material removal operation, the coated cutting insert comprising:
    a substrate having a flank surface and a rake surface wherein the flank surface intersects the rake surface to form a cutting edge at the intersection;
    a wear-resistant coating scheme adhering to at least a portion of the substrate, and the wear-resistant coating scheme comprising one or more coating layers of one or more of alumina, hafnia and zirconia; and
    a wear indicating coating adhering to at least a portion of the wear-resistant coating scheme, and the wear indicating coating comprising a mechanically treated $M(O_xC_yN_z)$ coating layer wherein M is selected from the group comprising one or more of the following titanium, hafnium, zirconium, chromium, titanium-aluminum alloy, hafnium-aluminum alloy, zirconium-aluminum alloy, chromium-aluminum alloy, and their alloys, and x>0, y≧0, z≧0 and y+z>0, and wherein the mechanical treatment lightens the color of the as-deposited $M(O_xC_yN_z)$ coating layer from a color unsuitable as a wear indicator to a visually perceivable color suitable as a wear indicator.

6. The coated cutting insert according to claim 5 wherein the wear-resistant coating scheme comprising alumina, and $M(O_xC_yN_z)$ is a bronze-colored titanium oxycarbonitride.

7. The coated cutting insert according to claim 6 further having an outermost coating layer of titanium nitride.

8. The coated cutting insert according to claim 6 further comprising a coating interlayer of titanium aluminum oxycarbonitride on the wear-resistant coating scheme.

9. The coated cutting insert according to claim 8 further comprising a base coating of titanium carbonitride on the coating interlayer.

10. The coated cutting insert according to claim 5 wherein the wear-resistant coating scheme exhibiting compressive residual stress.

11. The coated cutting insert according to claim 5 wherein the wear-indicator coating layer maintains adherence to the wear-resistant coating scheme through the mechanical treatment.

12. The coated cutting insert according to claim 5 wherein the wear indicating coating being on at least a portion of the rake face and at least a portion of the flank face.

13. The coated cutting insert according to claim 5 wherein the substrate presents a plurality of the cutting edges and wherein a selected one of the cutting edges is in engagement with the workpiece during the chip-forming material removal operation, and the wear indicating coating providing a visually perceivable indicator that the selected one of the cutting edges has been in use.

14. The coated cutting insert according to claim 5 wherein the wear indicating layer has a thickness ranging between greater than 0 micrometers and about 5 micrometers.

15. The coated cutting insert according to claim 5 wherein the wear indicating layer has a thickness ranging between greater than 0.1 micrometers and about 3 micrometers.

16. The coated cutting insert according to claim 5 wherein the wear indicating layer has a thickness ranging between greater than 0.5 micrometers and about 2 micrometers.

17. The coated cutting insert according to claim 5 wherein the wear-resistant coating scheme exhibiting a compressive residual stress in the range of between about 400 MPa and about 2000 MPa.

18. The coated cutting insert according to claim 5 wherein the wear-resistant coating scheme exhibiting a compressive residual stress in the range of between about 600 MPa and about 1000 MPa.

19. The coated cutting insert according to claim 5 wherein the wear-resistant coating scheme exhibiting a compressive residual stress in the range of between about 100 MPa and about 2000 MPa.

20. The coated cutting insert according to claim 19 wherein the wear-resistant coating scheme exhibiting a compressive residual stress in the range of between about 200 MPa and about 1000 MPa.

21. A coated cutting insert for use in a chip-forming material removal operation, the coated cutting insert comprising:
a substrate having a flank surface and a rake surface wherein the flank surface intersects the rake surface to form a cutting edge at the intersection;
a wear-resistant coating scheme adhering to at least a portion of the substrate, and the wear-resistant coating scheme comprising at least one coating layer of alpha-alumina, and the alpha-alumina coating layer exhibiting compressive residual stress;
a wear indicating coating adhering to at least a portion of the wear-resistant coating scheme, and the wear indicating coating comprising a $M(O_xC_yN_z)$ coating layer wherein M is selected from the group comprising one or more of the following titanium, hafnium, zirconium, chromium, titanium-aluminum alloy, hafnium-aluminum alloy, zirconium-aluminum alloy, chromium-aluminum alloy, and their alloys, and x>0, y≧0, z≧0 and y+z>0;
the wear indicating coating resulting from an as-deposited $M(O_xC_yN_z)$ coating exhibiting a color unsuitable as a wear indicator being subjected to a mechanical treatment; and
the wear indicating coating having a color visually perceivable from the alumina coating layer.

22. The coated cutting insert according to claim 21 wherein M is titanium.

23. The coated cutting insert according to claim 21 wherein the wear-indicator coating layer maintains adherence to the wear-resistant coating scheme through the mechanical treatment.

24. The coated cutting insert accruing to claim 21 wherein the wear indicating coating being on at least a portion of the rake face and at least a portion of the flank face.

25. The coated cutting insert according to claim 21 wherein the substrate presents a plurality of the cutting edges and wherein a selected one of the cutting edges is in engagement with the workpiece during the chip-forming material removal operation, and the wear indicating coating providing a visually perceivable indicator that the selected one of the cutting edges has been in use.

26. The coated cutting insert according to claim 21 wherein the wear indicating layer has a thickness ranging between greater than 0 micrometers and about 5 micrometers.

27. The coated cutting insert according to claim 21 wherein the alumina coating layer exhibiting a compressive residual stress in the range of between about 400 MPa and about 2000 MPa.

28. The coated cutting insert according to claim 21 wherein the alumina coating layer exhibiting a compressive residual stress in the range of between about 600 MPa and about 1000 MPa.

29. The coated cutting insert according to claim 21 wherein the wear-resistant coating scheme exhibiting a compressive residual stress in the range of between about 100 MPa and about 2000 MPa.

30. The coated cutting insert according to claim 29 wherein the wear-resistant coating scheme exhibiting a compressive residual stress in the range of between about 200 MPa and about 1000 MPa.

* * * * *

UNITED STATES PATENT AND TRADEMARK OFFICE
CERTIFICATE OF CORRECTION

Page 1 of 1

PATENT NO.       : 8,080,323 B2
APPLICATION NO.  : 12/057564
DATED            : December 20, 2011
INVENTOR(S)      : Zhigang Ban et al.

It is certified that error appears in the above-identified patent and that said Letters Patent is hereby corrected as shown below:

Column 10, line 52, "$\sigma_{100}$" should be -- $\sigma_\varphi$ --.

Column 18, line 32 in claim 24, "accruing" should be -- according --.

Signed and Sealed this
Twenty-fourth Day of April, 2012

David J. Kappos
*Director of the United States Patent and Trademark Office*